United States Patent
Howard (10) Patent No.: US 7,177,643 B2
(45) Date of Patent: Feb. 13, 2007

(54) WIRELESS NETWORK FOR ROUTING A SIGNAL WITHOUT USING A TOWER

(76) Inventor: Newton Howard, 7872 Seafarer Way, Lorton, VA (US) 22079

(*) Notice: Subject to any disclaimer, the term of this patent is extended or adjusted under 35 U.S.C. 154(b) by 164 days.

(21) Appl. No.: 09/924,885

(22) Filed: Aug. 8, 2001

(65) Prior Publication Data

US 2002/0090939 A1 Jul. 11, 2002

Related U.S. Application Data

(60) Provisional application No. 60/223,813, filed on Aug. 8, 2000.

(51) Int. Cl.
*H04Q 7/20* (2006.01)
*H04H 1/00* (2006.01)
*H04B 7/15* (2006.01)
*H04B 7/14* (2006.01)
*H04B 3/36* (2006.01)
*H04M 1/00* (2006.01)
*H04L 12/28* (2006.01)

(52) U.S. Cl. .......... 455/445; 455/3.01; 455/11.1; 455/446; 455/453; 455/16; 455/550.1; 455/556.2; 455/62; 370/279; 370/254; 370/293

(58) Field of Classification Search ........... 455/422, 455/13.1, 426.1, 5.1, 414, 517, 403, 418–419, 455/422.1, 423–425, 427, 429, 431, 453, 455/445–450, 452.1, 452.2, 462–466, 11.1, 455/12.1, 13.2, 556.1–556.2, 41.2, 62, 555, 455/557–558, 550.1, 3.01, 3.05, 456.1–456.3, 455/520, 524–525, 561, 455, 7, 16, 67.11; 370/389, 351, 352, 246, 406–408, 229, 373, 370/231–232, 237–238, 332, 254, 277, 279, 370/285, 293, 328, 315–316, 338, 400, 395.53; 709/203, 219, 227, 245, 236–242; 379/272–273; 375/211–212

See application file for complete search history.

(56) References Cited

U.S. PATENT DOCUMENTS

| | | | | |
|---|---|---|---|---|
| 5,450,405 A | * | 9/1995 | Maher et al. | 370/261 |
| 5,661,723 A | * | 8/1997 | Ueno et al. | 370/315 |
| 5,748,619 A | * | 5/1998 | Meier | 370/278 |

(Continued)

OTHER PUBLICATIONS

Fischer, Joannie; "The Radio, Reinvented"; U.S. News and World Report; Oct. 15, 2001; pp. 36-40; U.S.

*Primary Examiner*—Meless Zewdu
(74) *Attorney, Agent, or Firm*—Bingham McCutchen LLP (57) ABSTRACT

A wireless network is provided having a plurality of intermediate devices that can be dynamically added and removed from the wireless network. Each of the intermediate devices includes a transceiver operable to reproduce a signal and transmit the reproduced signal. At least one intermediate device in the plurality of intermediate devices is in motion while a part of the wireless network. A source device is operable to transmit a signal to at least one intermediate device and a destination device is operable to receive a reproduced signal from at least one of the intermediate devices without using a wireless tower. A routing path is transmitted from the source device along with the signal specifying the path that the signal is to travel.

21 Claims, 9 Drawing Sheets

U.S. PATENT DOCUMENTS

| | | | |
|---|---|---|---|
| 5,974,236 A * | 10/1999 | Sherman | 709/221 |
| 6,028,857 A * | 2/2000 | Poor | 370/351 |
| 6,038,595 A * | 3/2000 | Ortony | 455/5.1 |
| 6,044,062 A * | 3/2000 | Brownrigg et al. | 370/238 |
| 6,044,075 A * | 3/2000 | Le Boudec et al. | 370/351 |
| 6,104,712 A * | 8/2000 | Robert et al. | 370/389 |
| 6,108,314 A * | 8/2000 | Jones et al. | 370/294 |
| 6,415,312 B1 * | 7/2002 | Boivie | 455/432 |
| 6,452,910 B1 * | 9/2002 | Vij et al. | 370/310 |
| 6,512,754 B2 * | 1/2003 | Feder et al. | 370/338 |
| 6,526,034 B1 * | 2/2003 | Gorsuch | 370/338 |
| 6,560,329 B1 | 5/2003 | Draginich et al. | 379/265.02 |
| 6,633,757 B1 * | 10/2003 | Hermann et al. | 455/517 |
| 6,744,878 B1 | 6/2004 | Komissarchik et al. | 379/265.03 |
| 7,058,335 B2 | 6/2006 | Sugiura et al. | 399/100 |
| 2003/0110342 A1 | 6/2003 | Chiang et al. | 710/316 |
| 2004/0062224 A1 | 4/2004 | Brownrigg et al. | 370/338 |
| 2005/0117526 A1 | 6/2005 | Melnik | 370/254 |

* cited by examiner

WIRELESS NETWORK FOR ROUTING A SIGNAL WITHOUT USING A TOWER

CROSS REFERENCE TO RELATED APPLICATIONS

This patent application claims priority to commonly owned U.S. Provisional Patent Application Ser. No. 60/223,813 entitled "Wireless Communication System and Method" filed on Aug. 8, 2000 and U.S. patent application Ser. No. 09/912,918 entitled "Intention-Based Automated Conflict Prediction and Notification System" filed on Jul. 25, 2001, both of which are hereby incorporated by reference in their entirety.

TECHNICAL FIELD

The present invention relates generally to the field of wireless telecommunications networks and, more particularly, to a system of network interface cards that form a self-scaling, self-upgrading, nondeterministic communications network without using cellular towers or some other type of infrastructure.

BACKGROUND OF THE INVENTION

Commercial wireless communications networks consist of cellular phone or radio services supported by an array of short range transmission towers each providing coverage for an area or "cell," with an array of adjacent cells forming a network coverage area. More recently, a number of wireless service providers have begun combining satellite dish and terrestrial wireless technologies to augment the range and throughput of their signal to offer higher-bandwidth fixed wireless services such as interactive television (ITV) and high-speed Internet access. Each of these architectures requires a centralized network infrastructure to send and receive signals throughout the region and connect them to a land-based backbone.

Several technologies have been employed in digital wireless systems. These include Time Division Multiple Access (TDMA), in which users share the same frequency by transmitting and receiving only during short "time slots." A number of improvements have been made over the years to TDMA, including the introduction of the Global System for Mobile Communications (GSM), which allowed faster bit rates and the use of more natural-sounding voice compression algorithms. Another improvement was frequency hopping (in which the call actually changes frequency quite often during a transmission) which randomized the effects of co-channel interference and reduced multi-path interference. Recently, a new compression algorithm was added to GSM called the "Enhanced Full Rate CODEC" which can produce voice quality rivaling that of wire line telephones.

Another technology employed in digital wireless systems is Code Division Multiple Access (CDMA), in which instead of dividing up the users of a channel by time slots, everyone transmits at the same time and is separated by their encoding scheme. The military has used this type of technology for its communications, and most satellites communicate this way as well. Instead of using a narrow channel and modulating signals onto a fixed carrier, CDMA uses a very wide channel and spread the bits out using a "spreading algorithm." If one were to listen to such a transmission, it would sound like background noise.

Another wireless telecommunications system is the Personal Communications Service (PSC). This network utilizes a cell architecture that is similar to digital cellular systems using TDMA, although PCS cells are generally smaller.

A more recent wireless development is Multichannel Multipoint Distribution Service (MMDS), a fixed (i.e., using a non-mobile mounted dish) wireless access solution capable of providing both broadband data and voice connectivity. MMDS has been used for video broadcast services such as wireless cable and pay-per-view. Wireless broadband solutions are in part an attempt to solve the familiar last mile problem—it is extremely costly to string the last individual length of cable to every home in a region.

Wireless technologies have most recently been developed to extend the reach of Local Area Networks (LANs) to mobile devices throughout a building or corporate campus. These Wireless Local Area Networks (WLANs) allow users of wireless mobile devices including laptop/notebook computers and handheld device computers such as Personal Digital Assistants (PDAs) to connect to their LAN. Wireless LANs use electromagnetic waves (radio or infrared) to communicate information from one point to another without any physical connection. Thus, WLANs provide all the functionality of wired LANs, but without the physical constraints of the wire itself (as well as hubs, bridges, routers, and other infrastructure).

WLAN systems typically include wireless Network Interface Cards (NICs) that are installed in the various PDAs and laptops seeking connectivity, and Wireless Access Points (WAPs), which are fixed transmitter/receiver (transceiver) devices that are connected to the wired network by standard Ethernet cable. The WAPs function as miniature cellular towers, coordinating network traffic between the local network and a limited number of NIC-enabled devices. In other words, LANs can be thought of as consisting of many expensive and sophisticated elements (hubs, bridges, routers, etc.), and the user's NIC is simply an inexpensive onramp which connects the user to the LAN.

Over the last several years, WLANs have gained strong popularity in a number of vertical markets where mobile use is required, including the health care, retail, manufacturing, warehousing, and academic arenas. These industries have profited from the productivity gains of using handheld terminals and notebook computers to transmit real-time information to centralized hosts for processing. Increasingly, WLANs are becoming widely recognized as general-purpose connectivity alternatives for a broad range of business customers.

While these and other technologies represent significant advances in the development of wireless networks, there remain a number of problem areas. One such problem for cellular networks is that they require cellular towers, line-of-sight placement, and/or the purchase of a spectrum license. The process of planning, building, maintaining, and upgrading cellular towers and infrastructure is extremely costly. Cellular tower arrays are very costly to build because property rights must be secured for each tower or antenna location, which can be particularly expensive and difficult to arrange in cities, in addition to the costs of material and labor for each tower in the array.

Additionally, in planning to build out an array of towers to establish a coverage area for future users, it is impossible for the service provider to know in advance exactly how many customers will be using the network and where those customers will be. Because wireless networks allow for user mobility, this problem is magnified. The population of Manhattan more than triples each day as people from upstate New York, Long Island, the various other boroughs, and New Jersey commute into the city to work. However, the current cellular infrastructure is fixed and cannot respond to these fluctuating needs.

A related drawback is the scalability problem inherent in existing cellular, cable-modem, and ADSL (telephone co.) services. When more and more users access these networks, whether as new subscribers located within a cell or as mobile users passing through a cell, the network becomes flooded and cannot handle the volume being demanded. This can cause the speed of the network to slow down to a crawl. And because the network has a fixed capacity, at some point it will simply crash.

Furthermore, conventional wireless networks are not easily upgradable. Given the rapid rate of technological advance, the time currently required for new technologies to be integrated into the telecommunications infrastructure and offered to customers is no longer acceptable, so the existing model of upfront capitalization, installation, and amortization is simply not sustainable. By the time telecommunications and cable companies actually dig up their existing plant and get new equipment installed into the ground or onto the poles, it has already become obsolete (or soon will be). Therefore, cellular companies must continually upgrade thousands of towers and antennae in order to provide new types of services to compete and keep their customers.

Another problem with known wireless systems is signal degradation resulting from interference caused by objects and metals in the surrounding environment. The current approach for solving this problem is simply to use more power to force the signal through a crowded environment. This is a crude and inefficient solution to the problem.

With regards to conventional WLAN systems, a significant drawback is their limited range. WLAN technologies offer services that are far more localized than cellular, with effective operating distances typically in the 250 to 2500 foot range. Also, WLAN manufacturers generally offer only very low-end, low-power WAP hardware that supports only a dozen or so users per WAP. Therefore, users are effectively limited to short ranges beyond which they cannot use their PDA or laptop to access their LAN.

Moreover, a major problem with conventional wired systems that has not been overcome by current wireless systems is the last mile problem. Because of the high costs of stringing the last length of cable to every home in a region, telecommunications and cable television companies have only been able to provide access to broadband services to a limited number of homes and offices.

Accordingly, what is needed but not found in the prior art is a cost-effective wireless telecommunications architecture that operates without the need for costly cellular towers or infrastructure. Additionally, there is a need for such a network architecture that is infinitely scalable, broadband-capable, nondeterministic, and mobile-responsive to changes in user location. Furthermore, there is a need for a wireless device that can be used to connect to such a network as well as to WLANs and other networks.

SUMMARY OF THE INVENTION

The present invention meets the needs described above by providing a wireless network that uses existing wireless LAN protocols and products from established vendors to build an innovative and powerful broadband commercial network that does not need an infrastructure. The resulting network is has longer range, lower cost of deployment, and greater overall throughput, relative to other wireless networks. Additionally, the resulting network has bandwidth capabilities as good as or better than ADSL and cable.

The invention accomplishes these and other benefits by using wireless NICs, which do not need to be directly connected to one another to make use of one another and which are effectively idle probably about 99% of the time, and leverages them to pass network traffic and, therefore, to become the network itself. By extending the range of the signal via nondeterministic multi-path routing, these cards collectively form their own network distinct and operationally independent from that of the telephone company, cable company, or corporate LAN. In this way, the NICs provide a complete network topology such that there is no requirement for capitalizing, constructing, and operating cellular towers or infrastructure.

Additionally, because at least some of the NICs are transported around by the users, the present wireless system effectively commutes its entire infrastructure into the city with each user and subsequently follows them back to suburbia after they leave the office. In this way, the network organically responds to the increases and decreases in required capacity, thereby ensuring the optimal amount of coverage in any particular area at any given time. Also, the system includes algorithms that are nondeterministic, thereby permitting the network to grow, operate, and relocate itself organically.

Furthermore, the system architecture is self-scaling and continually upgraded as each new user is added to the network. The self-scaling feature is implemented by each new user dedicating to the network a portion (about ⅔ in a typical commercial embodiment) of its overall bandwidth capacity and providing an additional route through which network traffic can flow, thereby eliminating any potential bottlenecks. The network is continually upgraded because it is distributive, with users able to upgrade their equipment themselves. Also, the NICs can be designed to enable remote firmware programmability to enable transparent periodic upgrades. The bandwidth capacity is already an order of magnitude greater than cellular and, given this distributive upgrade capability, its rate of evolution will forever outstrip that of ADSL or cable. Distributive models of growth are very effective because they distribute both the cost and the responsibility for upgrades. Therefore, the distributed architecture is very effective because it is not held up by the latency of massive centralized capitalizations and buildouts by the telephone or cable company. Installations and upgrades can both easily be handled by the end user without ever needing to send a van out with service personnel to install a dish, string coaxial cabling, replace an antenna, or fix a downed telephone pole.

In addition to the benefits the NIC-implemented network, the present invention makes more efficient use of WLAN and other network resources. The invented system integrates both client and server functionality into the NIC cards to effectively extend the range of the network to as far as the users and NIC devices are deployed. The invention uses multiprocessor servers to function as WAPs, thereby eliminating the need for expensive but underpowered conventional WAP devices. This enables the network to support thousands of users per WAP, as opposed to dozens, making it possible for one or more WAPs to support the communications needs for an entire metropolitan community of users.

Additionally, the NIC-enabled devices in most networks are configured to handle the transmission of only their own data. Because most current NIC devices have 15 or more channels through which the signal cycles, at any given time there a number of open channels. The present invention makes use of all the channels at all times, propagating network traffic alongside that of the user. This effectively multiplies the bandwidth capabilities of the NIC devices, significantly enhancing the range and functionality of these WLAN devices.

Furthermore, the present invention provides a number of other benefits. In one form of the invention, for example, in order to reduce the signal degradation from objects in the surrounding environment that are commonly assumed to be merely obstructions, packet forwarding schemes are used to leverage these objects as passive routers/reflectors and propagate the signal nondeterministically through a multi-path route. And another form of the invention utilizes frequency hopping techniques in conjunction with security algorithms to ensure that all in-air signals are encrypted and randomized so that the original of the signal cannot be traced, which is an important benefit in military and other security-sensitive applications.

Generally described, the present is a wireless network for transferring a signal from a source device to a destination device positioned remotely from the source device by passing the signal through a plurality of intermediate devices without using a tower. The network includes a plurality of intermediate transceivers associated with the intermediate devices. These transceivers are individually operable for reproducing the signal and transmitting the reproduced signal through the intermediate devices until the reproduced signal reaches the destination device. A source transceiver associated with the source device is operable for transmitting the signal to at least one of the intermediate device. A destination transceiver is associated with the source device and is operable for receiving the reproduced signal from at least one intermediate device.

Alternatively, the invention is a method of transferring a signal from a source device to a destination device positioned remotely from the source device by passing the signal through a plurality of intermediate devices using a wireless network without a tower. The method comprises reproducing the signal using a plurality of intermediate transceivers associated with the intermediate devices and transmitting the signal through the intermediate devices until the signal reaches the destination device. In another step, the method identifies a routing scheme that enables effective signal transfer from the source device to the destination device. In addition, the method jointly transmits the routing scheme and the signal to at least one intermediate device using a source transceiver and receives the reproduced signal from the at least one intermediate device.

In view of the foregoing, it will be appreciated that the wireless network of the present invention avoids the drawbacks of prior systems. The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE EMBODIMENTS

The present invention may be embodied in a wireless nondeterministic network for transferring data signals throughout a geographical area without using cellular towers. Consequently, the invented network achieves numerous advancements including dramatically increasing signal propagation and an effectively unlimited range using forwarding of data packets through intermediate devices. By avoiding cellular towers, the invented network also substantially reduces costs.

Figure 1A:
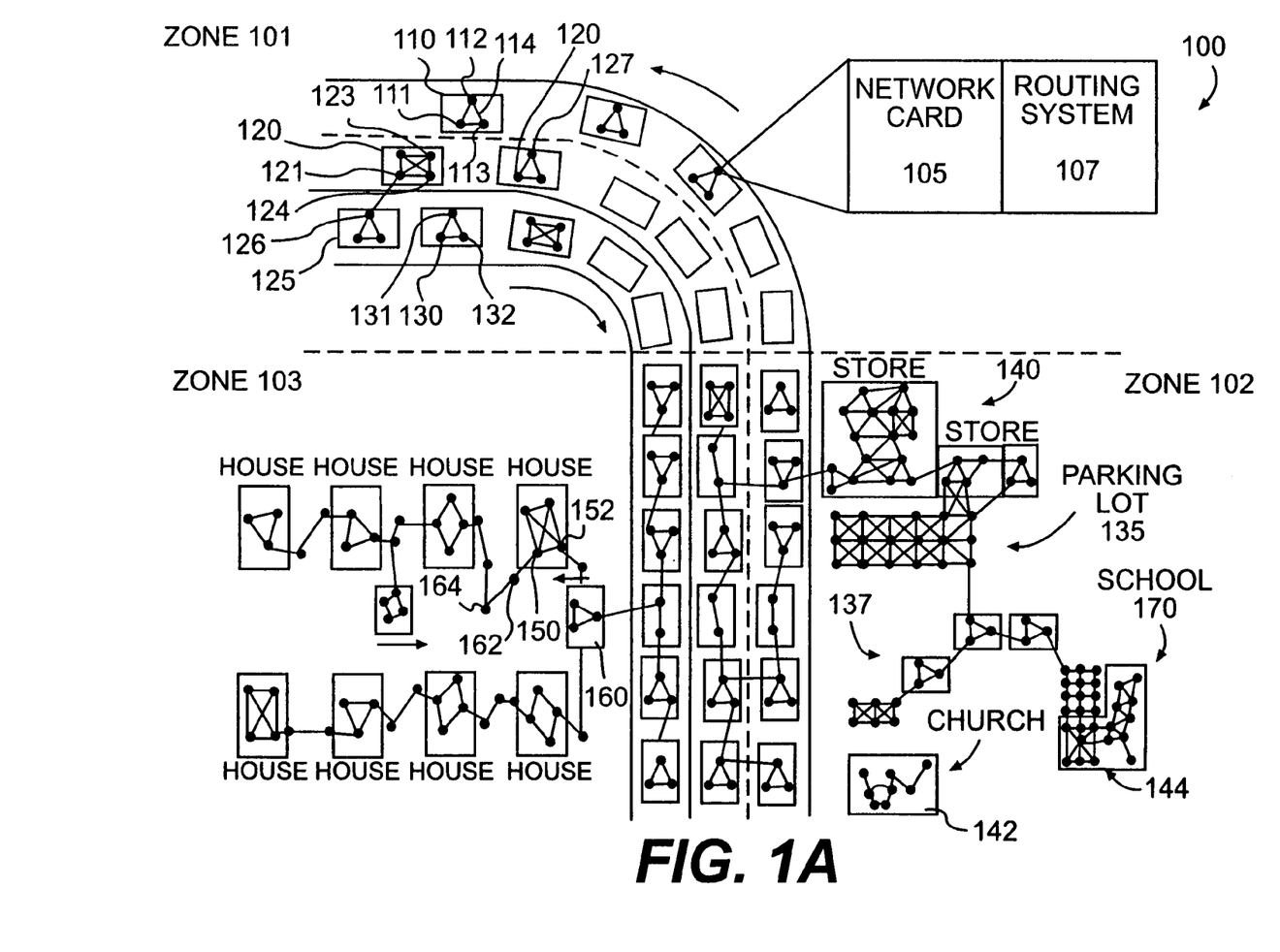
FIG. 1A is a functional block diagram of a wireless network illustrating automobiles that serve as the backbone of the network.

FIG. 1A is a functional block diagram of a wireless network 100 illustrating automobiles that serve as the backbone of the network. Each of the automobiles depicted as squares in FIG. 1A includes a network card 105 and routing system 107. The network card behaves like a transceiver in that it transmits and receives data from other devices connected to the network 100. The network card 105 is generally a PCMCIA type II card device that may be used with a host of devices. These devices include video boxes, notebook computers, portable computers, portable communication devices, and video game devices like the Sony® Playstation2® console. These devices are described in greater detail with reference to FIG. 1B.

Moreover, each of the cards 105 includes a radio device that enables wireless transmission of a data signal to remote devices. For example, the automobile 110 can include a network card 105 and a routing system 107 within a vehicle transceiver represented by the node 111. The vehicle transceiver is described in greater detail with reference to FIGS. 2A–2B. A passenger in the car could have a personal digital assistant (PDA) illustrated by node 112 that includes a network card 105. In addition the node 113 could represent a laptop computer that includes a network card 105 and routing system 107. Hence, the electronic devices within automobile 110 form a sub-network 114 that enables wireless transmission of data between devices within this automobile.

Because each of the network cards 105 transfer data, the cards characterize the data transmission capabilities of the network 100. The data range of a node directly corresponds to the data range of the network card 105. To comply with regulations, the data range of the network card 105 can be limited to 2.3 miles or any other compliant range. Each network card 105 generally provides approximately 7.7 Mbps of data throughput divided between user dedication and network dedication. Typically, 5.2 Mbps of the data throughput of the network card 105 is reserved for passing data packets on the network 100. As a result, an associated device such as a PDA can utilize only 2.5 Mbps of the total data throughput. In addition, the network card 105 can make the total data throughput of 7.7 Mbps available to forward data packets when the PDA is not using the reserved 2.5 Mbps.

In addition, the routing system 107 included within the node 111 and the node 113 can enable effective routing of data to other automobiles. For example, the network card 105 within the node 111 can transmit data from the automobile 110 while the node 112 can transmit data to the automobile 125. As mentioned above, each of the automobiles includes the routing system 107. The routing system 107 identifies the best routing scheme from a source device to a destination device using predictive location assessments and conflict resolution.

For example, the routing system 107 within the automobile 120 can determine that the most effective way to route data from the automobile 125 to the automobile 130 is by routing through the node 121 then through the node 122 to the node 131. An alternative routing scheme could be from the automobile 125 through the node 121 through the node 123 through the node 111 through the node 113 through the node 127 through the node 128 through the node 132 to the node 131. While the second routing scheme enables routing of data from the automobile 125 to the node 131, its apparent lack of efficiency could result in the routing system 107 choosing the first routing scheme.

Using automobiles as the backbone of the network 100 results in the creation of a more nondeterministic network. As the automobiles within this network continue moving, the physical locations of nodes in the network change. For example, the automobile 105 may pull onto the side of the road and park. When this vehicle becomes more than 2.3 miles away from the automobile 120, the network connection between automobile 110 and automobile 120 is severed. Conversely, an automobile, not shown, could enter onto the road in close proximity to automobile 120 and join the network 100 as long as this automobile included the network card 105. In this manner, nodes can be either added or removed from the network 100, which creates a constantly evolving network 100 that can cover a wide geographical area.

The geographical area depicted in FIG. 1 includes geographical zone 101, geographical zone 102, and geographical zone 103. Zone 101 generally represents a geographical area devoid of residential buildings or commercial establishments. This zone could represent busy interstates, state highways, or some other suitable type of road. Within this zone, automobiles transfer data from a source device to a destination device. As mentioned above, a driver of the automobile 125 can use a cellular phone represented by the node 126. In placing a call to mobile phone of the driver of automobile 130, the node 126 can determine the most efficient routing scheme. Consequently, the phone call can be route through the nodes 120, 121 in the mobile phone represented by node 131.

In contrast, zone 102 generally includes commercial establishments such as stores, a church, and a school. Though not shown, this commercial area could include various other types of business such as car dealerships, gas stations, fast food restaurants, bookstores, clothing stores, utility companies, or any other commercial establishment. In zone 102, stationary automobiles in parking lot 135, moving automobiles 137, and electronic devices within the stores 140, church 142, and school 144 can form a portion of the network 100.

Zone 103 primarily includes residential establishments such as houses, town homes, condominiums, duplexes, apartments, and other suitable dwellings. For any dwelling 150, numerous electronic devices such as televisions, computer systems, stereos, can include a network card 105 that establishes a network within this house. The network could include node 151 and 152. Moreover, the houses 150 can be connected so long as at least one node is positioned within the nodal range, 2.3 miles, of another node. As described with reference to zone 101, automobiles can also join the network 100 as indicated by automobile 160. In addition to automobiles and consumer electronics, the node 162 could represent a utility collection device that includes a network card 105. This device is described in greater detail with reference to FIG. 1B.

If the node 164 represented a mobile phone, a user of this phone could contact the user of a mobile phone represent by the node 170 at the school 145. Because the node 164 resides in zone 103 and the node 170 resides in zone 105, the network 100 can connect users of two different zones. If the mobile node 164 includes a routing system 107, this system can determine the best routing scheme for connecting the call to the node 170. In determining this scheme, the routing system 107 considers how long the automobile 160 will maintain connection between the zone 103 and the zone 102. In addition, the routing system 107 considers how long the moving cars 137 will maintain the connection between the parking lot 135 and the school 145. Similar to inter-zone data transfers, the invented network 100 can transfer data across vast geographical areas without using cellular towers.

Figure 1B:
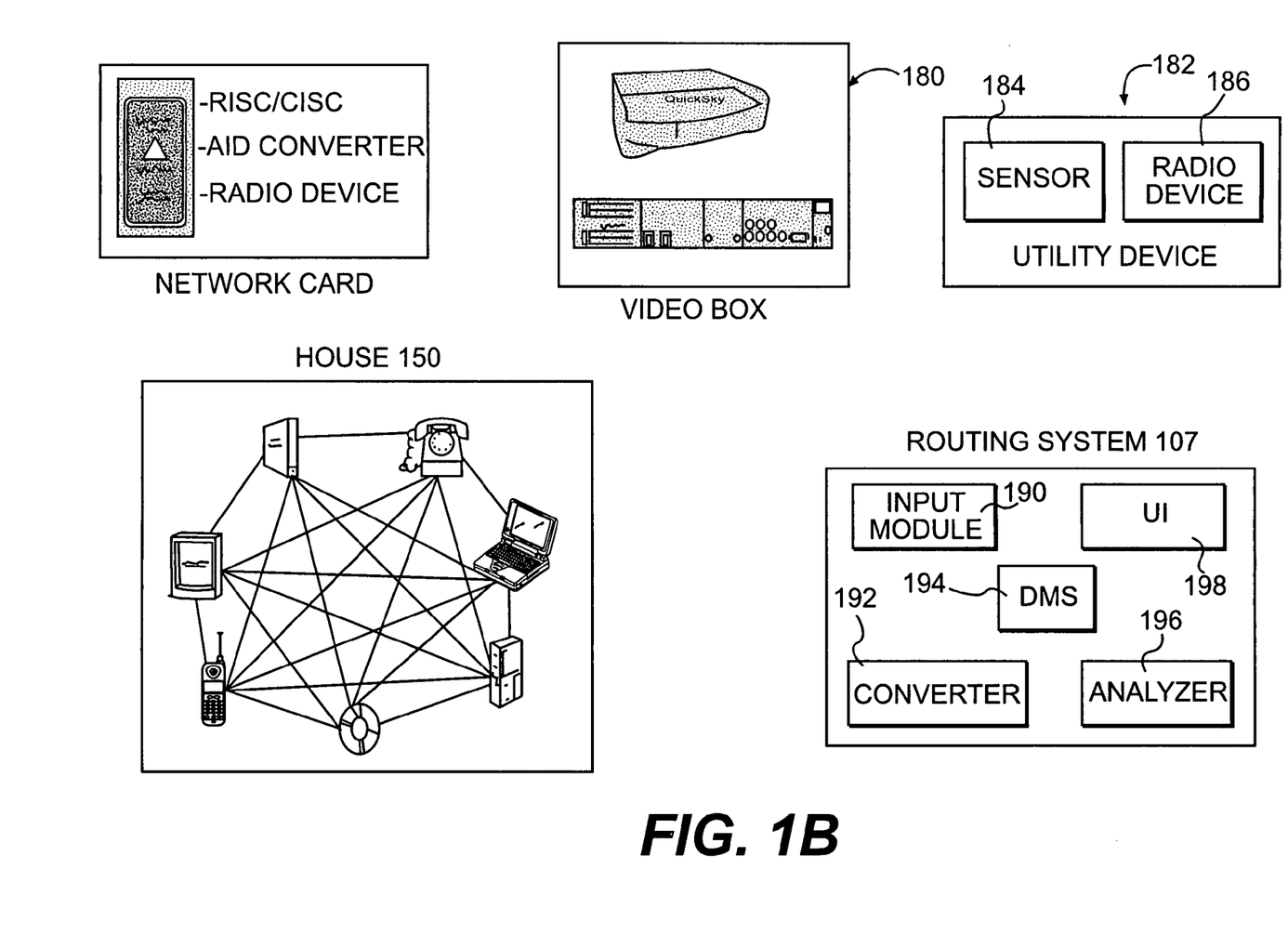
FIG. 1B is a functional block diagram of major network components illustrating the network card, routing system, and video box.

FIG. 1B is a functional block diagram of major network components illustrating the network card, routing system, and video box. The network card 105 functions as both a client and a server for the network 100. The network card 105 can include an application specific integrated circuit (ASIC) for facilitating the exchange of information between a radio interface and a digital interface. More specifically, the ASIC converts a digital signal to a radio signal with appropriate parameters and transmits this radio signal. To aid in the upgrading process, the ASIC within the network card 105 is remotely programmable. Conversely, the ASIC converts received radio signals into digital signals and subsequently processes these signals. While various types of ASICs can be used within the network 105, the 700 chip manufactured by Motorola® can also be used.

In addition, the ASIC can include various electronic devices connected by a bus. To handle processing on the ASIC, it can include either a reduced instruction set computer (RISC) processor or a complex instruction set computer (CISC) processor. The processor produces signals, processes received signals, and manages the transmissions of signals along the bus. In addition, the ASIC can include an analog to digital converter that places the formats a digital signal based on existing broadband wireless standards for a local area network (LAN). Finally the ASIC, within the network card 105, can include a radio device that transmits within the 900 MHz to 2.4 GHz range. In an alternative embodiment, the ASIC can include a switch that can connect the network 100 with public switched telephone network.

In another alternative embodiment, the ASIC can include a media array that connects the network 100 with either cable companies or satellite companies. When the ASIC includes a media array, it can be used with a video box 180. The video box 180 functions as a client terminal and router. Moreover, this box can host approximate network cards that connect Local Area Networks (LANs), personal computers, telephones, televisions, and other consumer electronics devices to the network 100. As indicated from a rear view of the box 180, each video box 180 includes a network card 105, a battery backup, telephone ports, a fast Ethernet connection, a television connection, an antenna, and four card slots. The telephone connections could be RJ-11 ports whiles the PC connection could be a universal serial port. The card slots could be PC Card Type II slots that produce expandability. In addition, a remote control for the video box can enable user customization. Hence users of the network 100 can connect to the PSTN, Internet, various electronic devices, or receive movie access from cable/satellite companies.

In a further alternative embodiment, the network card 105 can interface with a utility collection device 182. Within this device, a sensor 184 periodically determines the amount of a utility consumed. For example, the house 150 can include a utility collection device 182 that measures the amount of electricity used within the last thirty days. Instead of electricity, the device 182 can also measure readings for gas consumption and water consumption. By connecting this device to a serial port of a computer system, the readings can be transmitted across the network 100 to a utility company. Alternatively, the utility device 182 can include a radio device 186 that transmits the meter readings directly to the network 100. The radio device 186 could be housed within the network card 105.

As described with reference to FIG. 1A, the house 150 can include numerous networked electronic devices. Each of these devices including a personal digital assistant (PDA) can operate as an intermediate device by forwarding data received from a source device to a destination device. Moreover, the devices can also function as either a source device or a destination device. Together, these devices enable high-speed Internet access, broadcast television, mobile data, video access, digital telephone services, video on demand, pay per view, remote video storage, personalized radio, mobile telephone, and video communication. For telephone use, the transferred signals can be converted between a tri-band signal for a carrier such as Sprint® to a non-band specific signal.

The routing system 107 can be implemented by hardware, software, or firmware. During a hardware implementation, the routing system 107 includes an input module 190, converter 192, data management system (DMS) 194, analyzer 196, and user interface 198. For additional specifics regarding these modules, the reader is referred to U.S. patent application Ser. No. 09/912,918 filed on Jul. 25, 2001 entitled "Intention-Based Automated Conflict Prediction and Notification System," which has been incorporated by reference. The input module 190 accepts raw network state data from network nodes and processes this data. The processing step decomposes the raw data into relevant and distinct operators based on a set of rules in an attempt to determine the type of report that was entered and, through initial parsing, determine the users/devices to which the text applies.

This input module 190 passes the processed data to the converter 192. This converter transforms the state data into symbolic representations of ideas that may contain spatial or temporal concepts. The converter 192 passes the spatial-temporal data to the DMS. This DMS stores the time-based and spatial data produced or used by the network 100. This data may include, but is not limited to, IP addresses, user locations, frequency usage, device types, and imposed bandwidth constraints. In addition, the DMS 194 may include several databases including, but not limited to, a user database, a billing database that tracks bandwidth and time use, a device type and specifications database, and a security/encryption key database. Hence, the DMS maintains a past and present image of the network that enables predictive load balancing and support.

The analyzer 196 is a rule-based system that constantly assesses past, present, and future situations for conflicts and potential service problems. Using this information, the analyzer 196 determines the most effective path for routing traffic. In addition, this analyzer constantly solicits information from the DMS 194 maintain current information received from other locations. The analyzer 196 transfers changes and conflicts to the user interface (UI) 198. The UI 198 presents an interface to a system operator that identifies the network resource distribution and any conflicts in allocation.

Figure 2A:
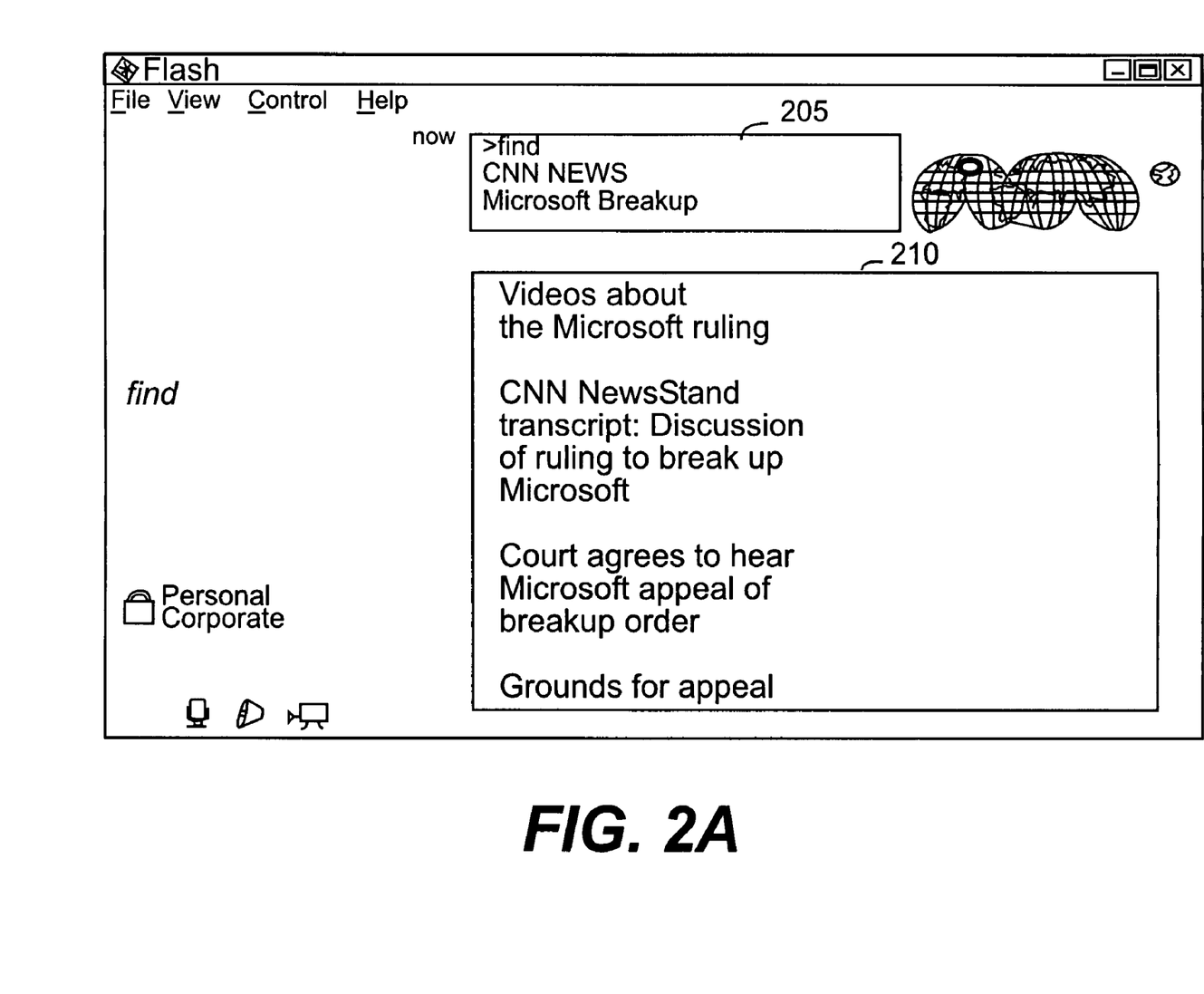
FIG. 2A is a multi-window screen 200 of a vehicle transceiver illustrating a real time broadcast.

FIG. 2A is a multi-window screen 200 of a vehicle transceiver illustrating a real time broadcast. As described with reference to FIG. 1A, each of the automobiles used with the network 100 can include a vehicle transceiver that facilitates forwarding data packets between a source device and destination device. The vehicle transceiver can include various sensors connected to different portions of the vehicle's mechanical system. For example, sensors could be attached to the braking system, transmission system, and engine system. As a component within these systems reach a potential fail range, the sensor could transmit an alert. The vehicle transceiver also includes a user interface that enables communication with a user. A user can communicate with the vehicle transceiver using any one of a host of input devices including a voice recognition device, a touch-sensitive screen, a touch-sensitive pad, a keypad, or any other suitable device.

The user interface can include a multi-window screen 200 that includes an input window 205 and display window 210. The input window 205 can display commands received from the user. For example, a user can speak the command "Find CNN News Microsoft® Breakup." In response, the screen 200 puts this command in the input window 205 while placing the results of the command in the display window 210. The settings for the display window can be such that enables clear viewing by a user.

In addition, the screen 200 can be a host of other commands that enable the user interface to complete a host of other tasks. For example, a user can speak "Connect Newton," which may place a telephone call to an individual named Newton. Alternatively, a user can speak "Connect email," which prompts user interface to check the user's email. In another alternative embodiment, a user can speak "Connect video Newton," which prompts the user interface to arrange a videoconference with an individual named Newton. In a similar manner, a user can request that the user interface complete several tasks regarding scheduling. In addition, a user can request that the user interface completes a command that conflicts with a previously issued command. The user interface can place a conflict notice in the display window 210. To review previously issued commands, a user may speak "Object today," which would display all the commands received by the user interface on that day. By reviewing these commands, a user can resolve the conflict. Alternatively, the user interface can display the conflicting commands in the display window 210.

Figure 2B:
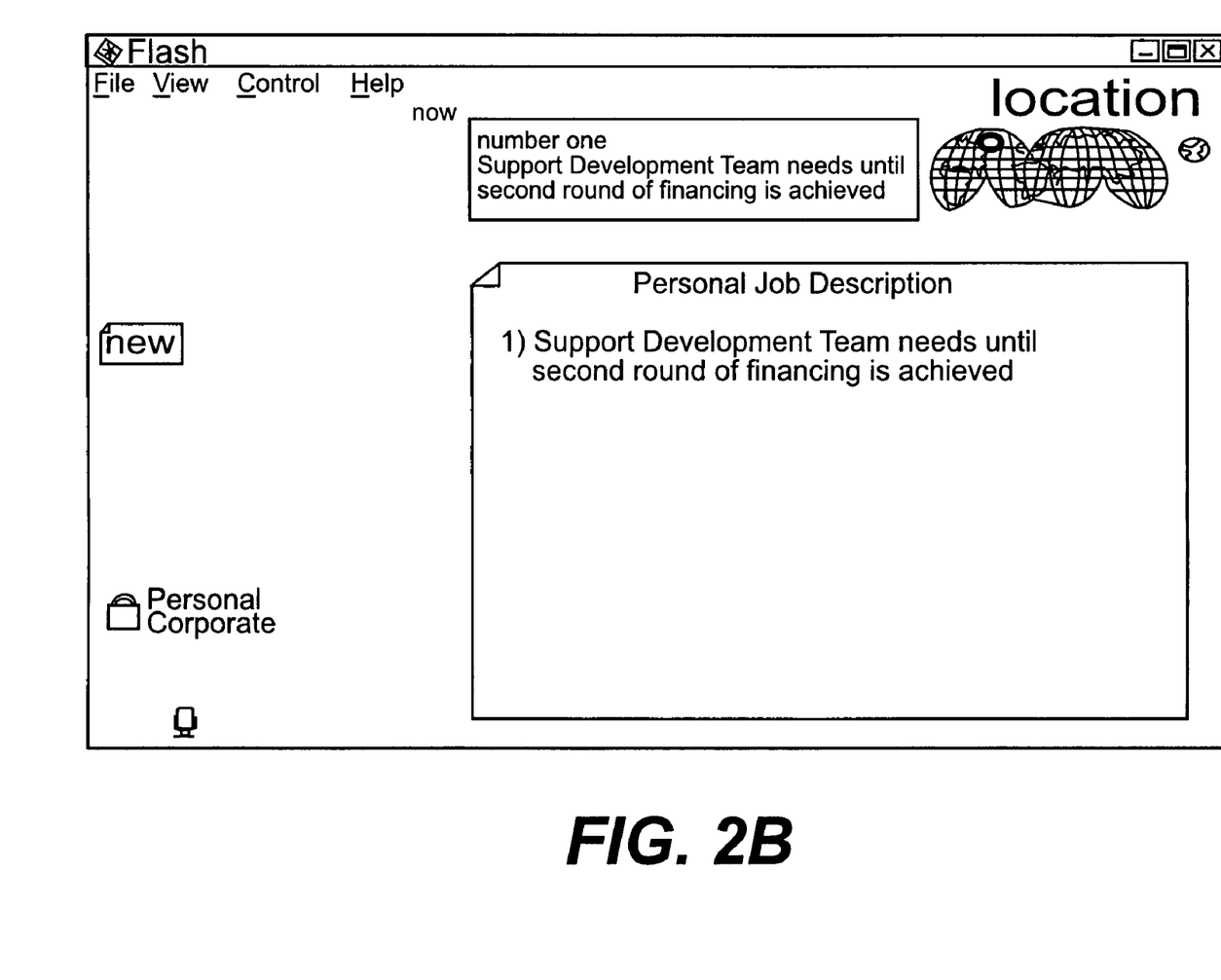
FIG. 2B is a multi-window screen of a vehicle transceiver illustrating hands free dictation.
Figure 2C:
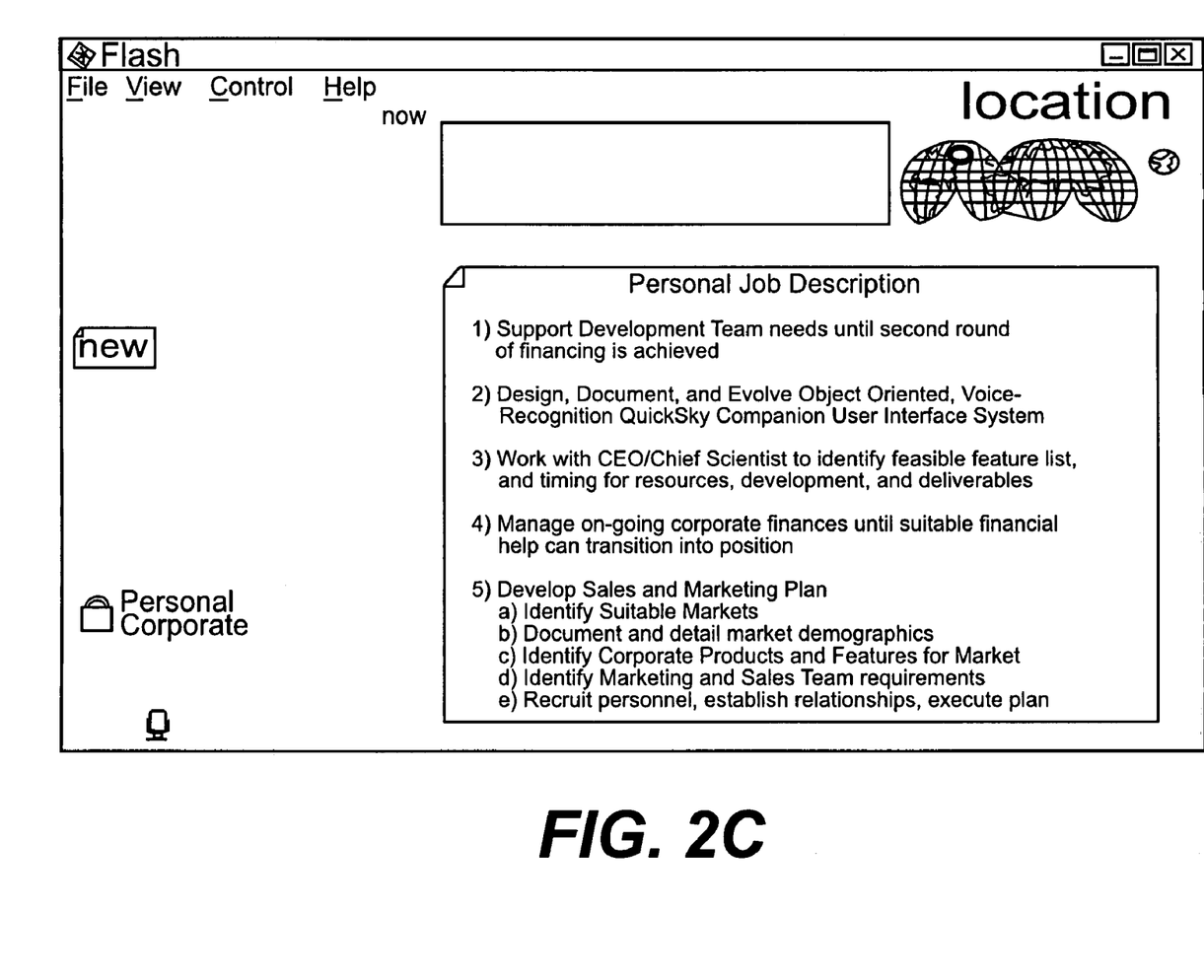
FIG. 2C is a multi-window screen of a vehicle transceiver illustrating a document entered by dictating and manually entering text.

FIG. 2B is a multi-window screen of a vehicle transceiver illustrating hands free dictation. Using one of the input devices, a user can request that the user interface open a new corporate document within the display window 210. In addition to allowing a designation between types of documents, the user interface can also work in conjunction with security features that hinder unauthorized access of secure documents. After opening the corporate document, the user can dictate "Personal Job Description" and request centering of this phrase. The user may then begin dictating the information. In addition, a user can opt that the user interface in the vehicle transceiver converts to a manual mode. In this mode, a user can enter data directly into the vehicle transceiver and produce. FIG. 2C is a multi-window screen of a vehicle transceiver illustrating a document entered by dictating and manually entering text.

Figure 2D:
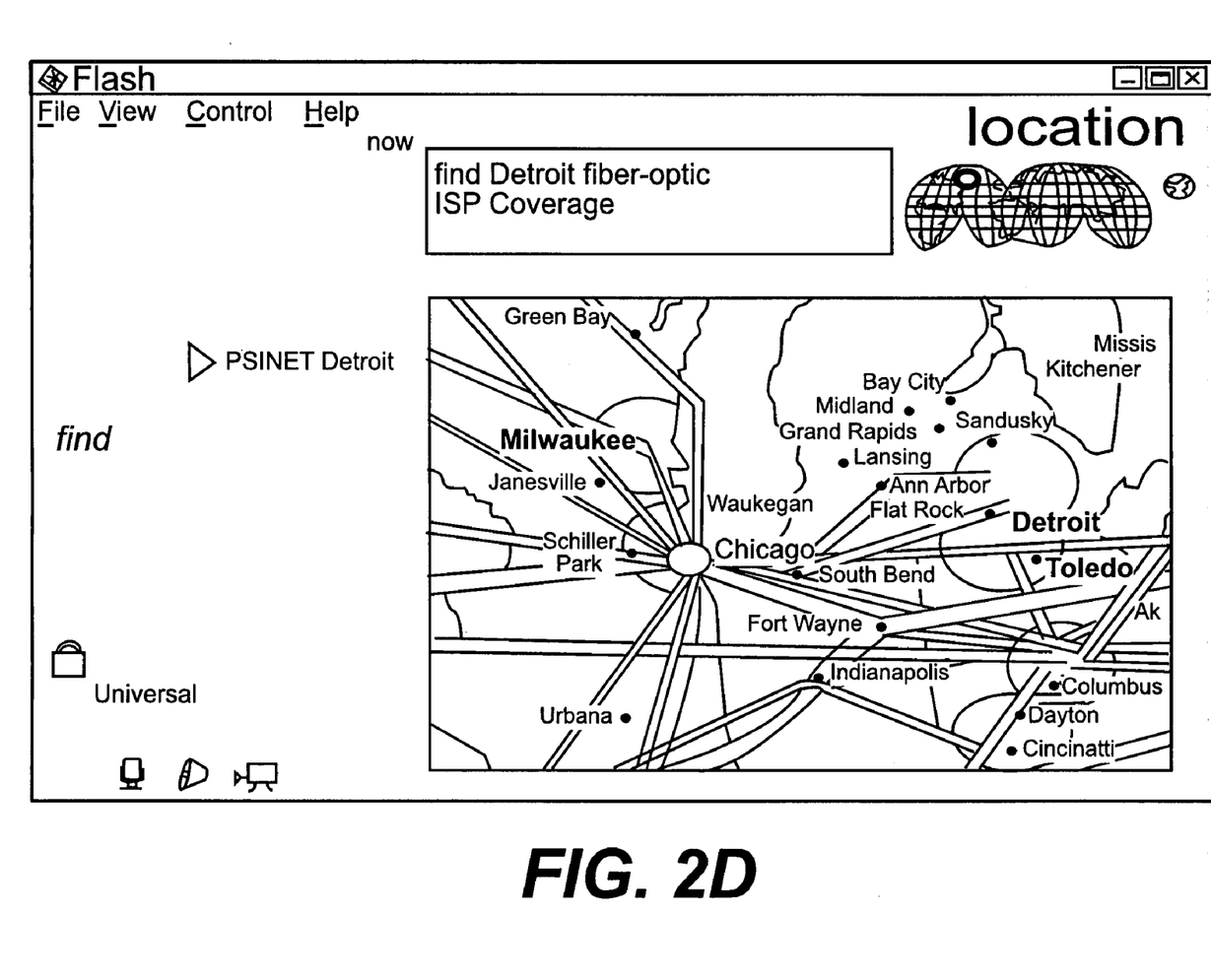
FIG. 2D is a multi-window screen illustrating the result of searching for the fiber-optic coverage area within a particular city.

FIG. 2D is a multi-window screen illustrating the result of searching for the fiber-optic coverage area within a particular city. As mentioned above, a user can specify using one of the input devices that the user interface determines the fiber-optic coverage areas for Internet service provider in Detroit. In response, the user interface can place a map of Detroit and other areas that a user will travel through within the display window 210.

Figure 3:
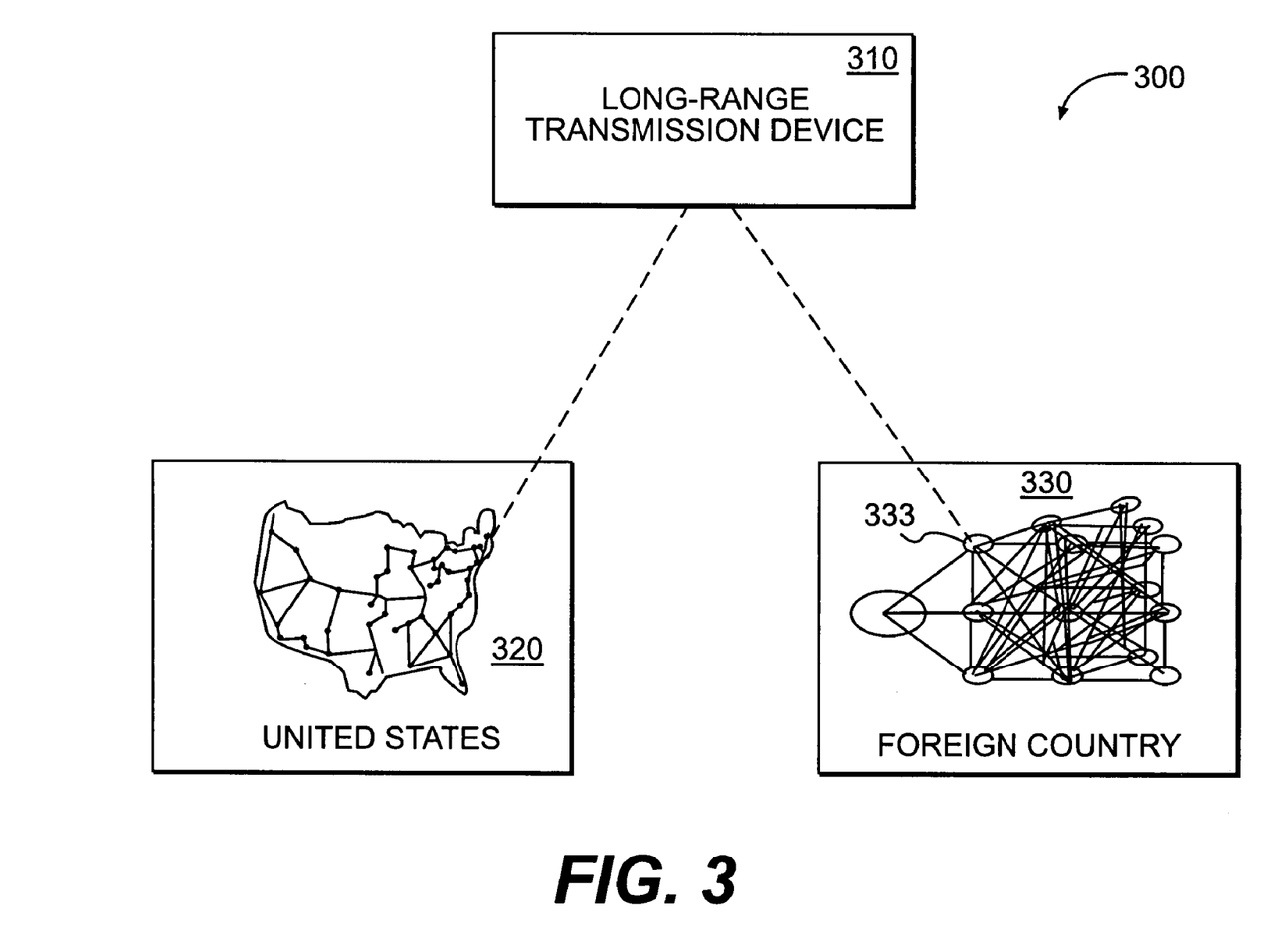
FIG. 3 is a functional block diagram of an alternative embodiment of a wireless network illustrating use of that facilitates wireless transfer of signals across considerable geographical distances.

FIG. 3 is a functional block diagram of an alternative embodiment of a wireless network 300 illustrating use of that facilitates wireless transfer of signals across considerable geographical distances. These distances can include distances between continents, rural areas, or any other distance not covered by the network 100. Alternatively, the long-range transmission device 310 can be used in conjunction with the network in providing premium connection for a certain region. For example, calls between California and New York could be routed using the transmission device 310 faster even though network 100 could connect the call.

Within the United States, a sub-network 320 facilitates transfer among states. Consequently, a mobile call from California to New York can be connected using the network 320. Similarly, the sub-network 330 facilitates the transfer among remote locations in the foreign country. However, a soldier in the foreign country can place a call to a location in the United States. Several nodes within the network 330 will forward the data associated with the phone call until it reaches the node 333. The node 333 transfers this data to the long-range transmission device 310. This device could be anyone of several devices including a satellite or a Tropo dish.

Figure 4:
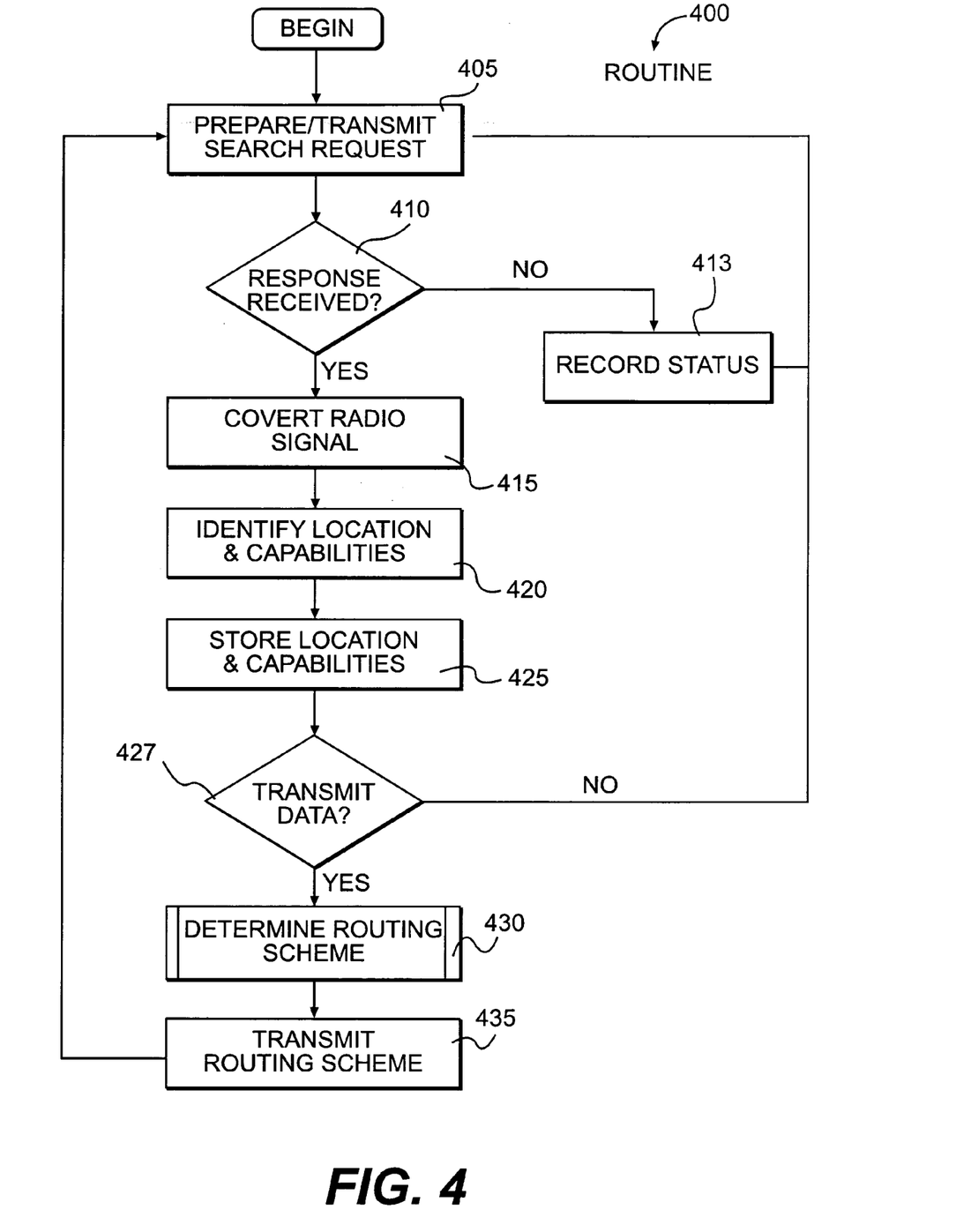
FIG. 4 is a logic flow diagram for a method of transmitting a signal to a remote location by using a host of intermediate devices.

FIG. 4 is a logic flow diagram for a method of transmitting a signal to a remote location by using a host of intermediate devices. In step 405, the routine 400 prepares and transmits the search request. Generally, this step is completed by the ASIC inside the network card 105 for one of the network nodes. More specifically, the ASIC processor transmits this request to the A/D converter, which sends it to the radio device. The radio device then uses predefined circuitry in selecting the bandwidth for transmitting the search request. In sending this request, the ASIC processor tries to assess if there are any other network-enabled devices in the vicinity.

Step 405 is followed by step 410, in which the routine 400 determines if a response is received. If a response is not received the "NO" branch is followed from step 410 to step 413. Because each network node includes a network card 105 with a predefined range, a response will not be received if other network devices are not located within that range. For example, an automobile may have moved further than 2.3 miles from the network node that issued the query. Thus, the vehicle transmission device within the automobile would not respond to the search request issued in step 405.

In step 413, the routine 400 records status information. Typically, the ASIC processor notes the time the request was sent and that a response was not received. After noting this information, the ASIC processor can transfer this information to the routing system 107 for storage in the data management system 194. Step 413 is followed by step 405, in which the routine 400 prepares and transmits the search request. By repeating step 405, the routine 400 can identify when a network-enabled device joins the network.

If a response is received, the "YES" branch is followed from step 410 to step 415. When a neighboring device receives the search request, the ASIC of the neighboring transmits a response to the search request. The response generally includes the location of the neighboring device as well as other network nodes connected to the device. Using the node 121 and the node 126 in FIG. 1, the node 126 could send a search request. In response, the node 121 could send a message back to the node 126 indicating the location of the node 121 as well as the location of the nodes 122–123. In addition, the response to the search request could indicate the capabilities of each of these nodes. The capabilities could include the distance that each node can transmit as well as the type of data that each node will transmit. For example, one node could transmit voice data.

In step 415, the routine 400 converts the radio signal that responded to the search request. Typically, the radio device processes the response and forwards it to the A/D converter. Step 415 is followed by step 420, in which the routine 400 identifies the location and capabilities of the received signal. After receiving the response from the converter, the ASIC processor analyzes the response for location information and capabilities. By analyzing this information, the ASIC processor acquires a better idea about the structure and coverage area of the network 100. Step 420 is followed by step 425, in which the routine 400 stores the location and capabilities of the radio signal 415. After receiving this information, the ASIC processor can update the state of the network 100 to include these newly identified nodes.

Step 425 is followed by step 427, in which the routine 400 determines if it should transmit data. In making this determination, the ASIC processor can determine if it has data from either a network-enabled device or from the routing system 107. For example, the node 126 can transfer data to the node 121. The ASIC processor of the node 121 determines that it should transmit data. If data should not be transmitted, the "NO" branch is followed from step 427 to step 405. If data should be transmitted, the "YES" branch is followed from step 427 to subroutine 430. In subroutine 430, the routine 400 determines the routing scheme of the received data. In this step, the ASIC processor within the network card 105 passes control over to the routing system 107. This subroutine 430 will be described in greater detail with reference to FIG. 5.

In an alternative embodiment, some network-enabled devices do not include the routing system 107. Instead, these devices only include the network card 105. Consequently, the step 427 is followed by the step 435. These devices essentially forward data packets based on a predefined routing scheme. If the node 132 did not include a routing system, the node 132 could essentially forward data packets that it receives to the next node identified in the received routing scheme. If the node 132 is the source device that is, if this node needs to transmit data to a destination device, the node 132 can transfer information to the nearest node with a routing system. For example, when the node 132 received a response to the search request from the node 130, the node 132 could indicate that it includes a routing system 107. Consequently, the node 132 could transmit all of the data that it generates to node 130 for routing. In this manner, some simple electronic devices, like handheld gaming systems, are not complicated by additional routing electronics.

Step 430 is followed by step 435 in which the routine 400 transmits the routing scheme. The routing system 107 returns to the ASIC processor inside the network card 105 a routing scheme. The routing scheme includes the information that needs to be transferred. In addition, the routing scheme identifies a route between the source device and the destination device that the data should be sent. After receiving the routing scheme, the ASIC processor forwards this routing scheme to the A/D converter, which forwards the scheme to the radio device. The radio device transmits the data to the first network-enabled device identified in the routing scheme. After receiving this data, this network-enabled device forwards the data to the next node identified in the routing scheme. In forwarding the data, the network nodes reproduces the original signal in that these nodes regenerate the signal so as to maintain the power level and avoid signal degradation. This repeats until the data reaches the destination device, as described with reference to the node 170 in FIG. 1.

Step 435 is followed by step 405 in which the routine 400 prepares and transmits the search request. Though not clearly indicated on FIG. 4, the ASIC processor within the network card 105 periodically transmits a search request in parallel with the routine 400. Typically, the processor sends this request every 39 ns. However, sending a request this frequently could warrant use of additional equipment. A repetition rate of 39 ns warrants addition power, which can increase low-level emission of radiation. To avoid this problem, solar panels or self-cooling batteries can be used instead of typical power supplies. Alternatively, the transmission cycle can be modified to a range of 3 to 19 seconds using standard batteries.

Figure 5:
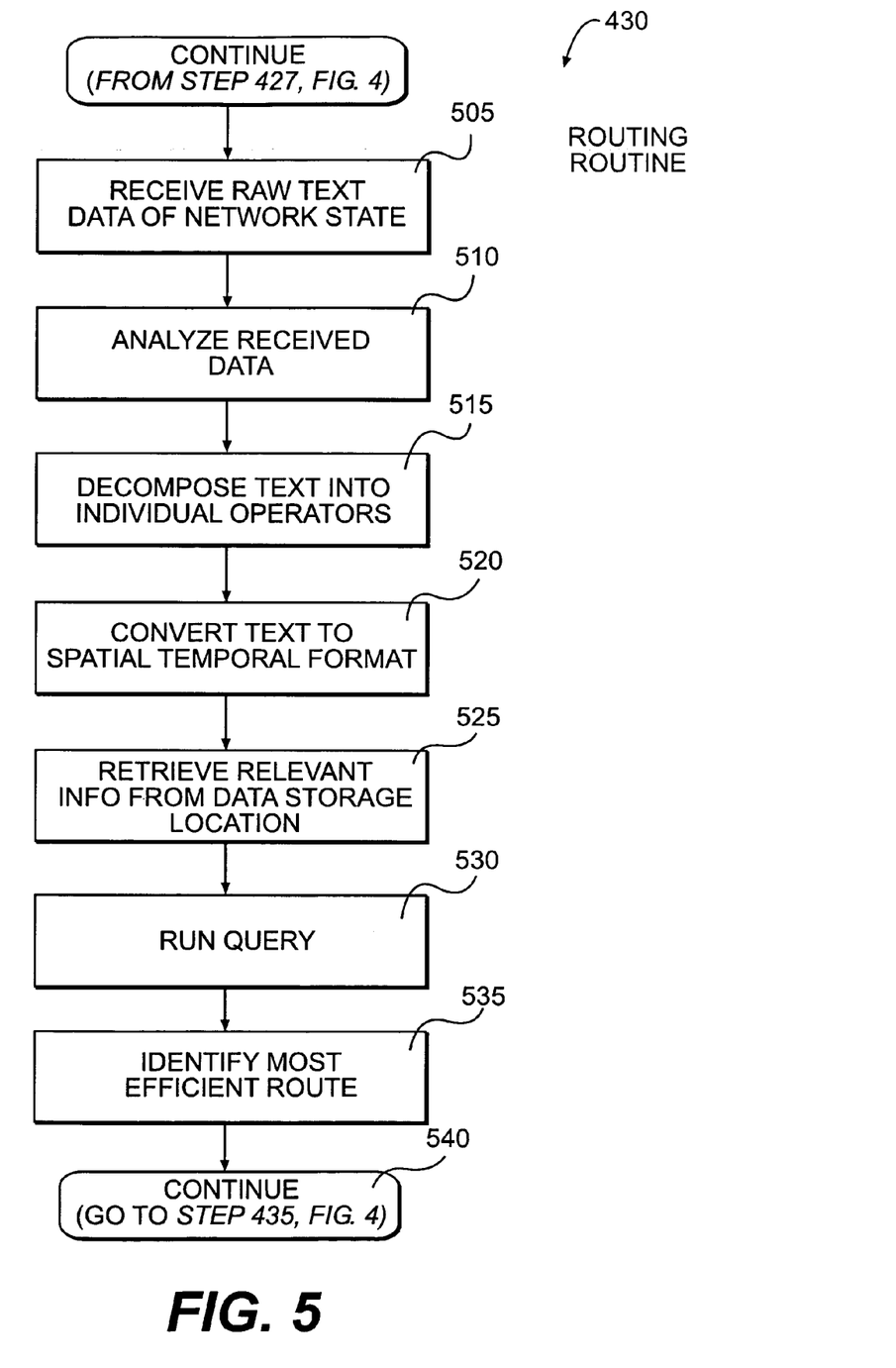
FIG. 5 is a logic flow diagram illustrating the routing subroutine of FIG. 4.

FIG. 5 is a logic flow diagram illustrating the routing subroutine 430. This subroutine continues from step 427 on FIG. 4. As described with reference to FIG. 1B, the routing system 107 can be implemented using hardware, software, or some combination of the two. The subroutine 430 represents a software implementation of some of the modules within the routing system 107. In addition, these routing system components are housed within the device instead of on the network card 105. For example, the routing system 107 can be an application program that runs on a laptop. In contrast, the network card 105 that includes the ASIC processor can be housed within a PCMCIA card that slides into the laptop.

In step 505, the routine 430 receives raw text data of the network state. Generally, this data is received from the ASIC processor of the network card 105. After receiving this data routing system can store this data in a data storage location, such as the data management system 194. The step 505 is followed by step 510, in which the routing routine 430 analyzes the received data. Step 510 is followed by step 515, in which the routing routine 430 decomposes the text into individual operators. The input module 190 can perform the process of both analyzing and decomposing the data as described with reference to FIG. 1B.

Step 515 is followed by step 520 in which the routing routine 430 converts the text to a spatial-temporal format. The converter 192 transforms the natural language data into symbolic representations of state data. Step 520 is followed by step 525 in which the routing routine 425 retrieves relevant information from a data storage location. The data storage location could be a single database or a collection of databases managed by the data management system (DMS) 194. This DMS can include a dynamic picture of actual physical locations of the network 100.

Step 525 is followed by step 530 in which the routing routine 425 runs a query of the relevant information from the database. This query could be a simple question, such as "What was the last picture of the network?" Step 530 is followed by step 535 in which the routing routine 425 identifies the most efficient route to send the relevant information from the database 525. Typically, the analyzer 196 completes this step. In completing this step, this analyzer can begin looking for patterns that can affect future data packets received for processing. In this manner, the network 100 constantly evolves by learning from present circumstances and using this learned information in predicting future circumstances.

Based on the response to the query, the analyzer 196 can use the last state of the network in combination with predefined rules in predicting the location of certain network nodes. For example, the analyzer could predict that the number of cars available at a business will decrease substantially by 5:00 p.m. Consequently, the analyzer may try routing some packets through stationary devices during the early evenings. To determine routing, the analyzer also compares the maximum power range available from the network with the distance needed for data transmission. For example, the analyzer 196 realizes that a call from New York to LA warrants 3000 miles of coverage and only 2000 miles of coverage may be available. To bridge this gap, the analyzer 196 may advocate routing the call to a long-range transmission device 310. After determining how to route the data, the analyzer 196 sends this routing information along with data back to the ASIC processor inside the network card 105. Step 535 is followed by the "CONTINUE" step 540, in which the subroutine returns to step 435 on FIG. 4.

It will be understood that the method described above can be carried out in various sequences, and the sequences describe herein are provided as an illustration only and by no means as a limitation. It will be further understood that the terms "a," "an," and "one" as used herein are not intended to mean only "one," but may also mean a plurality, and terms used in the plural form can include the singular form.

In view of the foregoing, it will be appreciated that present invention provides a wireless network that is easily upgradable and expandable. In addition, the invented network can provide a coverage area of approximately 200 miles using approximately 36 network cards 105. Because each network node reserves at least a portion of the bandwidth for passing network traffic, the invented network can automatically respond to changing conditions of the users and effectively respond to high traffic use. In addition, the invented network provides increased security and enables use in military applications. Because many networked nodes pass every data signal, the source node is not easily identified. This along with other technology such as encryption can create a very secure network.

Other advantages include that the network substantially minimizes cost by not needing an infrastructure and using an unlicensed portion of the spectrum, which avoids licensing fees. Integrated routing capabilities in each unit eliminate the need for traditional cellular radio towers. In addition, the invented network allows bandwidth scalability in that users can put multiple network cards in the video box. Network scalability is provided in that new user dedicate a portion of their bandwidth to passing network traffic. The invented network does not need a line of sight in that it can transmit through buildings, trees, and other obstacles. Finally, the invented system uses devices with ultra-low radiation emissions that provide safe use, while allowing support for mobile devices, homes and offices.

It should be understood that the foregoing relates only to the exemplary embodiments of the present invention, and that numerous changes may be made therein without departing from the spirit and scope of the invention as defined by the following claims.

The invention claimed is:

1. A wireless network for transferring a signal from a source device to a destination device positioned remotely from the source device by passing the signal through a plurality of intermediate devices without using a tower, the network comprising:
   a plurality of intermediate transceivers each respectively associated with one of the intermediate devices and individually operable for reproducing the signal and transmitting the reproduced signal through the intermediate devices until the reproduced signal reaches the destination device;
   a source transceiver associated with the source device and operable for transmitting the signal to at least one of the intermediate devices;
   a destination transceiver associated with the destination device and operable for receiving the reproduced signal from at least one of the intermediate devices; and
   a routing system for determining an optimal routing path for transferring the signal from the source device through a set of the intermediate devices of the plurality of intermediate devices to the destination device, wherein the optimal routing path indicates the set of intermediate devices and is based, in part, on a prediction of the amount of time an intermediate transceiver in the set of intermediate transceivers will be in communication with the wireless network, wherein the prediction is based on the last state of the wireless network and predefined rules for predicting the location of at least one of the intermediate devices in the wireless network.

2. The network of claim 1, wherein the source transceiver transmits the optimal routing path and the signal to the intermediate device.

3. The network of claim 1, wherein the routing system further comprises a data management system.

4. The network of claim 1 wherein the source device is selected from the group consisting of telephones, mobile phones, laptop computers, handheld computers, desktop computers, televisions, and automobiles.

5. The network of claim 1 wherein one of the intermediate devices disconnects from a first portion of the network and reconnects to a second portion of the network.

6. The network of claim 1 further comprising a long-range transmission device for connecting the network to a remote network.

7. The network of claim 1, wherein an intermediate device having an intermediate transceiver operable for reproducing the signal and transmitting the reproduced signal is dynamically added to the plurality of intermediate devices in the network.

8. The network of claim 1, wherein at least one of the intermediate devices in the plurality of intermediate devices is dynamically removed from the network.

9. The network of claim 1, wherein at least one of the intermediate devices in the plurality of intermediate devices is in motion for a period of time.

10. A wireless network for transferring a signal from a source device to a destination device positioned remotely from the source device by passing the signal through a plurality of intermediate devices without using a tower, the network comprising:
   a plurality of intermediate transceivers each respectively associated with one of the intermediate devices and individually operable for reproducing the signal and transmitting the reproduced signal through the intermediate devices until it reaches the, destination device;
   a source transceiver associated with the source device, wherein the source transceiver is operable for jointly transmitting the signal and an optimal routing path for transferring the signal from the source device through at least one of the intermediate devices of the plurality of intermediate devices to the destination device, wherein the optimal routing path indicates the at least one intermediate device, and is based, in part, on a prediction of the amount of time an intermediate transceiver in a set of intermediate transceivers within the plurality of intermediate transceivers, will be in communication with the wireless network, wherein the prediction is based on the last state of the wireless network and predefined rules for predicting the location of at least one of the intermediate devices in the wireless network.

11. The network of claim 10 wherein the routing system further comprises a data management system.

12. The network of claim 10 wherein the source device is selected from the group consisting of telephones, mobile phones, laptop computers, handheld computers, desktop computers, televisions, and automobiles.

13. The network of claim 10 wherein one of the intermediate devices disconnects from a first portion of the network and reconnects to a second portion of the network.

14. The network of claim 10 further comprising a long-range transmission device for connecting the network to a remote network.

15. The network of claim 10, wherein an intermediate device having an intermediate transceiver operable for reproducing the signal and transmitting the reproduced signal is dynamically added to the plurality of intermediate devices in the network.

16. The network of claim 10, wherein at least one of the intermediate device in the plurality of intermediate devices is dynamically removed from the network.

17. The network of claim 10, wherein at least one of the intermediate devices in the plurality of intermediate devices is in motion for a period of time.

18. A method of transferring a signal from a source device to a destination device positioned remotely from the source device by passing the signal through a plurality of intermediate devices forming a wireless network without a tower, the method comprising:
   reproducing the signal using a plurality of intermediate transceivers each associated with one of the intermediate devices;
   transmitting the reproduced signal through a set of intermediate devices in the plurality of intermediate devices until the reproduced signal reaches the destination device;
   identifying an optimal routing path for transferring the signal from the source device to the destination device, wherein the optimal routing path indicates the set of intermediate devices and is based, in part, on a prediction of the amount of time an intermediate transceiver in a set of intermediate transceivers within the plurality of intermediate transceivers, will be in communication with the wireless network, wherein the prediction is based on the last state of the wireless network and predefined rules for predicting the location of at least one of the intermediate devices in the wireless network;

jointly transmitting the optimal routing path and the reproduced signal to the set of intermediate devices using a source transceiver; and receiving the reproduced signal from the intermediate device at the destination device.

19. The method of claim 18, further comprising dynamically adding, to the plurality of intermediate devices in the network, an intermediate device having an intermediate transceiver operable for reproducing the signal and transmitting the reproduced signal.

20. The method of claim 18, further comprising dynamically removing at least one of the intermediate device in the plurality of intermediate devices from the network.

21. The network of claim 18, wherein at least one of the intermediate devices in the plurality of intermediate devices is in motion for a period of time.

* * * * *